United States Patent
Dodd

(10) Patent No.: US 12,035,838 B2
(45) Date of Patent: Jul. 16, 2024

(54) METHODS AND SYSTEMS ASSOCIATED WITH BREWING COFFEE

(71) Applicant: Anthony Duane Dodd, Spicewood, TX (US)

(72) Inventor: Anthony Duane Dodd, Spicewood, TX (US)

(*) Notice: Subject to any disclaimer, the term of this patent is extended or adjusted under 35 U.S.C. 154(b) by 782 days.

(21) Appl. No.: 17/114,574

(22) Filed: Dec. 8, 2020

(65) Prior Publication Data

US 2021/0186252 A1    Jun. 24, 2021

Related U.S. Application Data

(60) Provisional application No. 62/949,962, filed on Dec. 18, 2019.

(51) Int. Cl.
*A47J 31/043* (2006.01)
*A23F 5/48* (2006.01)
*A47J 31/06* (2006.01)
*A47J 31/44* (2006.01)

(52) U.S. Cl.
CPC ............ *A47J 31/043* (2013.01); *A23F 5/486* (2013.01); *A47J 31/0605* (2013.01); *A47J 31/4407* (2013.01)

(58) Field of Classification Search
CPC .. A47J 31/043; A47J 31/0605; A47J 31/4407; A47J 43/046; A47J 27/2105; A47J 31/14; A47J 31/34; A47J 31/44; A47J 31/4403; A47J 43/1081; A47J 31/002; A47J 31/053; A47J 31/24; A47J 31/30; A47J 31/32; A47J 31/462; A47J 31/469; A47J 31/56; A47J 43/0716; A47J 43/0722; A23F 5/486
USPC ......... 99/279, 300, 280, 294, 317, 322, 323, 99/323.3
See application file for complete search history.

(56) References Cited

U.S. PATENT DOCUMENTS

| | | | |
|---|---|---|---|
| 2,234,397 A * | 3/1941 | Bentz | A47J 31/06 |
| | | | D7/400 |
| 2,577,990 A | 12/1951 | Zskn et al. | |
| 6,468,332 B2 | 10/2002 | Goglio et al. | |
| 7,032,507 B2 | 4/2006 | Cai | |
| 9,402,405 B2 | 8/2016 | Vastardis et al. | |
| 9,907,430 B2 | 3/2018 | Vastardis et al. | |
| 10,028,615 B2 | 7/2018 | Anthony et al. | |
| 10,667,644 B2 | 6/2020 | Gormley et al. | |
| 2004/0020368 A1 * | 2/2004 | Cai | A47J 27/2105 |
| | | | 99/279 |
| 2006/0174773 A1 | 8/2006 | Taylor | |
| 2007/0109913 A1 * | 5/2007 | McGill | A47J 43/0722 |
| | | | 366/205 |
| 2008/0308177 A1 | 12/2008 | Thuot et al. | |
| 2012/0219686 A1 | 8/2012 | Bombeck et al. | |
| 2013/0133524 A1 * | 5/2013 | Vastardis | A47J 31/32 |
| | | | 99/300 |
| 2015/0208849 A1 * | 7/2015 | Melzer | A47J 31/4403 |
| | | | 99/287 |

\* cited by examiner

*Primary Examiner* — Chris Q Liu
(74) *Attorney, Agent, or Firm* — Pierson IP, PLLC

(57) ABSTRACT

Systems and methods for submerging coffee within water in a chamber directly below a filter, creating a vacuum within the chamber, removing carbon dioxide through the filter while preventing the formation of carbonic acid, and creating another vacuum within the chamber.

18 Claims, 3 Drawing Sheets

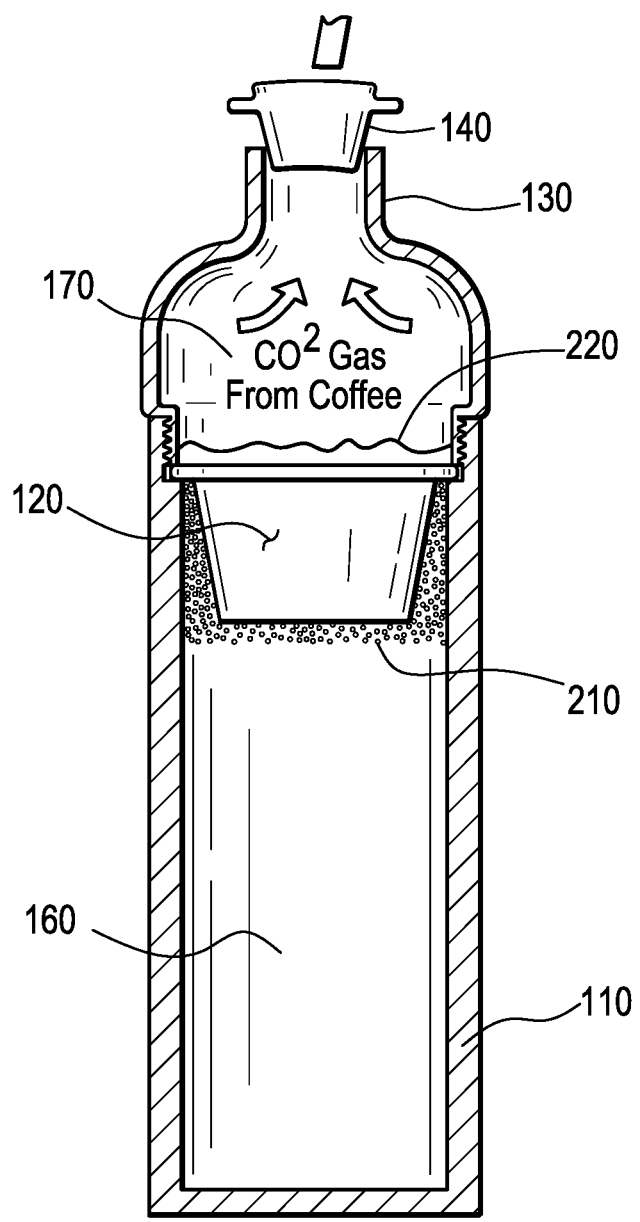

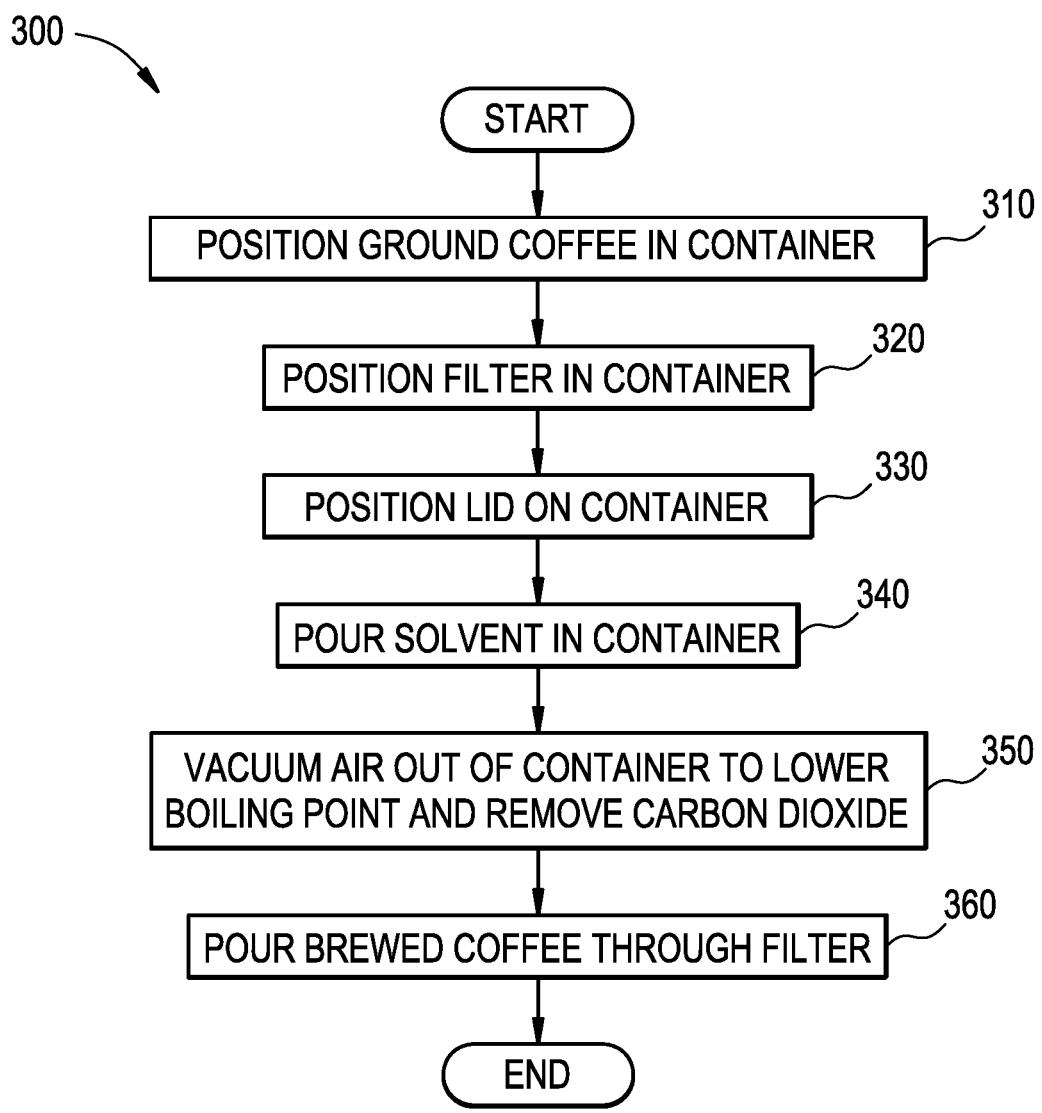

METHODS AND SYSTEMS ASSOCIATED WITH BREWING COFFEE

TECHNICAL FIELD

This disclosure relates generally to systems and methods for brewing coffee. Specifically, this disclosure relates to submerging ground coffee within water in a chamber directly below a filter, creating a vacuum within the chamber, removing carbon dioxide from ground coffee while preventing the formation of carbonic acid during the brew process, and pouring the brewed coffee through the filter.

BACKGROUND

It is well known that exposing coffee to oxygen has detrimental effects on the quality of the taste of coffee. The detrimental effects being when roasted coffee beans are ground and last until a finished product is consumed as a liquid beverage. Furthermore, it is also well known that carbon dioxide becomes trapped in coffee molecules during the bean roasting process, and this trapped carbon dioxide prevents ground coffee from becoming fully saturated with brew water, which prevents a full and balanced extraction of flavor compounds existing in the coffee molecules.

Conventionally, coffee beans are vacuum sealed in a container during transportation, ground, and placed within a coffee pod for brewing. Although methods exist for vacuum brewing coffee, these methods require the ground coffee to be exposed to oxygen multiple times during multiple cycles where a vacuum is drawn and then released. This allows oxygen to be present during brewing.

Accordingly, needs exist for a hot coffee brewing system where exposure of ground coffee to oxygen is limited during the brewing cycle due to the ground coffee being immersed within a solvent, wherein the carbon dioxide is removed from the brewed coffee during the brewing process while a chamber has a lower pressure than atmospheric pressure during the entire brew process, and carbonic acid is prevented from forming due to ground coffee being fully submerged within solvent when carbon dioxide is released.

SUMMARY

Embodiments described herein disclose systems and methods for brewing coffee. Embodiments mitigate the problems of detrimental oxidation during the brewing process by removing, via a vacuum, a portion of the oxygen from a sealed brewing container through a one way valve. Thus, the coffee is brewed within a vacuum, and the impacts of oxidation are reduced, which results in a more desirable taste. Furthermore, during the brewing cycle, the ground coffee may be immersed within a solvent and positioned adjacent to a filter within the sealed brewing process below a water line. During brewing under negative atmospheric pressure, carbon dioxide may travel through the filter and be removed from the system, limiting the formation of carbonic acid within the brewed coffee, since ground coffee is prevented from exposure to air and water simultaneously when carbon dioxide is converted into gaseous form. Embodiments may include a container, filter, lid, and one way valve.

The container may be a device that is configured to hold and store ground coffee and a solvent, such as water. In embodiments, the container may include single or double plated inner walls that limit the amount of heat loss within the container. The container may include a threaded proximal end that is configured to allow the filter to be coupled to the lid, wherein the threads for a seal. In embodiments, a first chamber may be configured to be formed within the container below the filter. The first chamber may be configured to allow the coffee to brew.

The filter may be configured to filter spent beverage ingredients, such as coffee grounds, tea leaves, etc. The filter may be configured to be positioned over a proximal end of the container, and filter the spent beverage ingredients when the coffee is poured out of the container. In embodiments, the filter may be formed out of stainless steel, paper, nylon. The filter may include openings between 50 µm and up to 150 µm.

The lid may be configured to be positioned over the proximal end of the container and the filter. The lid may have a distal end that is configured to be coupled with the threaded proximal end of the container to form a seal. A proximal end of the lid may be configured to receive the one way valve. In embodiments, a second chamber may be formed between the filter and the proximal end of the lid. When in use, carbon dioxide from the first chamber may be configured to flow across the filter and into the second chamber, where the carbon dioxide may be removed to limit carbonic acid from forming in the first chamber.

The one way valve may be configured to be positioned on the proximal end of the lid. The one way valve may be configured to allow substances to flow from the second chamber into the atmosphere. Initially, the one way valve may be configured to remove oxygen from the container forming a vacuum. Then, the increased volatility of the heated solvent brought on by the reduction of atmospheric pressure causes carbon dioxide and other gases to seep out of the ground coffee beans. These gases may travel across the filter into the second chamber. Next, the one way valve may be activated by a vacuum pump to remove the gases from the second chamber. Furthermore, by forming a continuous vacuum within the first chamber, the pressure within the first chamber may remain low, which may correspondingly lower the boiling point of the coffee. This lowering of the boiling point may allow the coffee to be brewed without an external heating source.

In use, coffee beans may be placed in a first chamber within the container. Then, a filter may be placed over the first chamber, followed by coupling a lid with the container to form a second chamber between the filter and the lid, followed by an appropriate amount of hot solvent, such as water, to a level above the filter so as to submerge the coffee beans. A one way valve within the lid may be used to draw out gases from the first chamber, lowering the pressure within the first and second chamber to allow the coffee to continue to brew. During brewing, gases, such as carbon dioxide, and a head of foam may travel into the second chamber from the first chamber across the filter. The carbon dioxide may be removed from the second chamber via a vacuum, while the vacuum is still formed in the first and second chamber. By positioning, the filter and the one way valve above the first chamber, the carbon dioxide does not have to travel across the solvent during the brewing process, which may limit the amount of carbonic acid formed within the brewed coffee.

Accordingly, embodiments create a vacuum that is configured to remove the majority of carbon dioxide trapped inside ground coffee during the roasting process, which then enables the ground coffee to become fully saturated within water. This allows a maximum transfer of flavor compounds into the brewed coffee. The total submersion of the ground coffee directly below the filter allows carbon dioxide to be withdrawn from the ground coffee and removed from the system without the ground coffee being exposed to air and water simultaneously, during the brew process, while the carbon dioxide gas is escaping the ground coffee. This prevents carbonic acid from forming during the brew process or oxidation.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components.

FIG. 2 depicts a brewing system, according to an embodiment.

FIG. 3 illustrates a method for brewing coffee, according to an embodiment.

Figure 1:
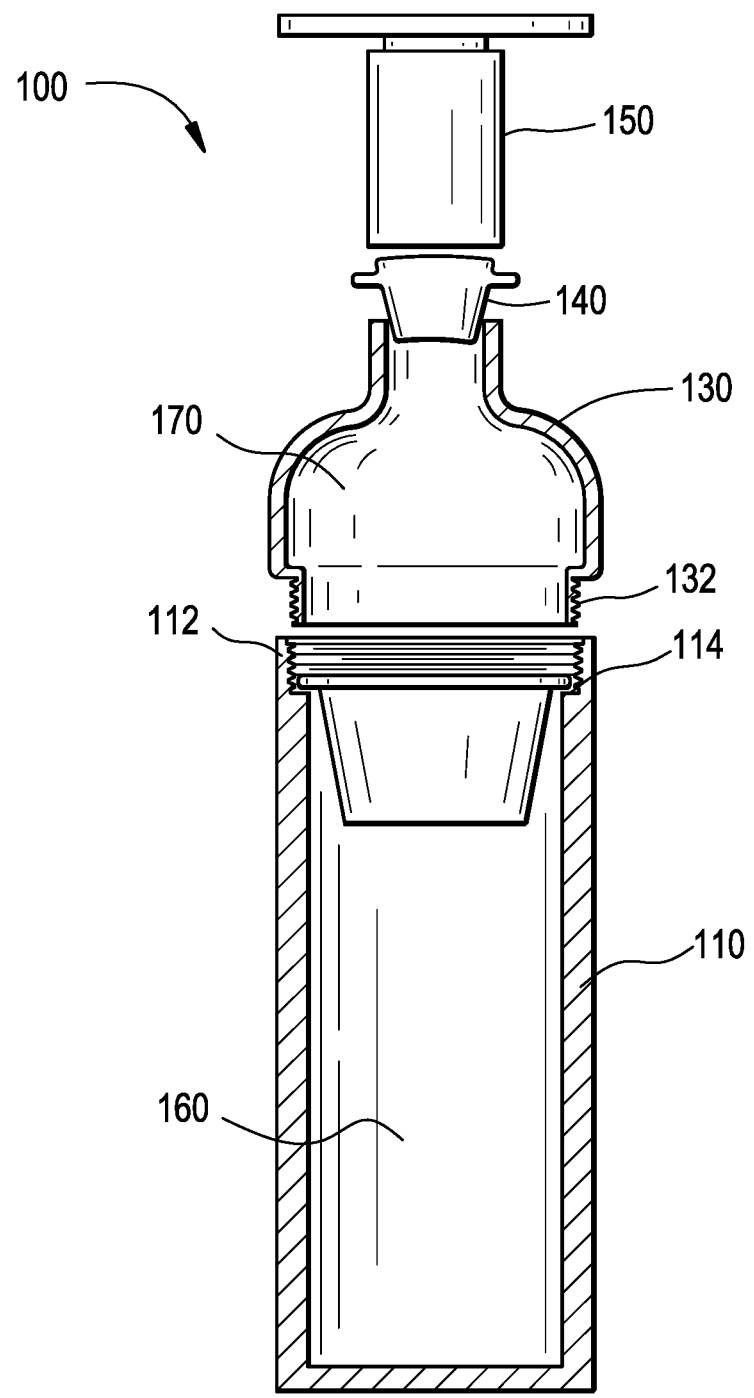
FIG. 1 depicts a system for brewing coffee, according to an embodiment.

Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail.

It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

FIG. 1 depicts a system 100 for brewing coffee, according to an embodiment. System 100 may include a container 110, filter 120, lid 130, one way valve 140, and vacuum 150.

Container 110 may be a device that is configured to hold and store a beverage ingredient, such as coffee, and a solvent, such as water. Container 110 may include single or double plated inner walls that are configured to limit the amount of heat loss within container 110. Container 110 may have a height to diameter ratio of approximately 4:1. This may allow container 110 to act as a fractionating column to optimize conditions desired for the separation of compounds from the beverage ingredient into the solvent. Container 110 may have a threaded proximal end 112, wherein the threads are configured to be coupled with a container to form a seal. Container 110 may also include a lip 114 below threads 112.

Lip 114 may have a smaller inner diameter than that of threads 112, and be configured to allow a proximal end of filter 120 to be secured in place between lip 114 and a distal end of lid 130.

Filter 120 may be configured to filter spent beverage ingredients, such as coffee grounds, tea leaves, etc. Filter 120 may be conical in shape, and have a larger upper diameter than lower diameter. This may allow an annulus to be formed between the outer circumference of filter 120 and an inner diameter of container 110. Furthermore, the larger upper diameter of filter 120 may allow filter 120 to be positioned on lip 114, wherein lip 114 may restrict a downward movement of filter 120. In embodiments, filter 120 may be formed out of stainless steel, paper, nylon, etc. Filter 120 may include openings between 50 µm and up to 150 µm. In embodiments, filter 120 may be a stainless steel basket that is configured to act as a divider between a first chamber and a second chamber, and is configured to secure the ground coffee below the surface of the water for the entire brew cycle. Filter 120 may also be configured to filter brewed coffee when the brewed coffee is poured out of a proximal end of the brewing system 100.

Lid 130 may be configured to be positioned over the proximal end of container 110 and filter 120. Lid may have a threaded distal end 132 that is configured to be coupled with the threaded proximal end 112 of container 110 to form a seal. Furthermore, responsive to coupling lid 130 with container 110, the distal end 132 of lid may apply compressive forces against an upper surface of filter 120. These forces may be configured to retain filter 120 in place. A proximal end of the lid 130 may have an opening that is configured to receive the one way valve 140. When lid 130 is coupled to container 110, a first chamber 160 may be formed between a distal end of container 110 and filter 120 and a second chamber 170 may be formed between filter 120 and the proximal end of lid 130. When in use, carbon dioxide from the first chamber 160 may be configured to flow across the filter 120 and into the second chamber 170, where the carbon dioxide may be removed to limit carbonic acid from forming in the first chamber 160. In embodiments, lid 130 may be formed of transparent materials, such that a user may monitor when carbon dioxide and foam is positioned within second chamber 170.

One way valve 140 may be configured to be positioned on the proximal end of the lid 130. One way valve 140 may be configured to allow substances to flow from the second chamber 170 into the atmosphere while restricting substances from flowing from the atmosphere into second chamber 170. In embodiments, one way valve 140 may be a removable component from the proximal end of lid 130, or one way valve 140 may be an integral component formed within lid 130.

Vacuum 150 may be a device that is configured to produce suction to decrease the pressure within second chamber 170. Vacuum 150 may force air within second chamber 170 upward across one way valve 140 into the atmosphere.

FIG. 2 depicts brewing system 100, according to an embodiment. Elements depicting in FIG. 2 may be described above, and for the sake of brevity a further description of these elements is omitted.

As depicting in FIG. 2, ground coffee 210 may be positioned within a solvent 220 below filter 120. Ground coffee 210 may be positioned within the annular space between the inner diameter of container 110 and the outer diameter of filter, as well as below a lower surface of filter 120. Accordingly, the ground coffee 210 positioned within the solvent 220 may encompass the bottom surface of the filter.

The solvent 220 may be positioned within container 110, such that the entire first chamber 160 and a bottom layer of second chamber 170 is submerged in the solvent. This may cause the entirety of the ground coffee 210 to be submerged in solvent 220.

Initially, vacuum 150 may be configured to remove oxygen from the container 110. Then, the heated solvent positioned within first chamber 160 causes carbon dioxide and other gases to seep out of the ground coffee beans due to the increased volatility of the solution brought about by the reduction in atmospheric pressure. These gases may travel across filter 120 into second chamber 170. Next, one way valve 140 may be activated by a vacuum 150 to remove the gases from the second chamber 170, without the pressure within second chamber 170 dropping. By forming a continuous vacuum within the second chamber 170, the pressure within the second chamber 170 may remain low. This may correspondingly lower the boiling point of the coffee. The lowering of the boiling point may allow the coffee to be brewed without an external heating source.

FIG. 3 illustrates a method 300 for brewing coffee, according to an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

At operation 310, coffee or a beverage ingredient may be placed within a container.

At operation 320, a cone filter may be positioned over a proximal end of the container to form a first chamber between the cone filter and the distal end of the container. The coffee within the hot solvent may be positioned proximate to or adjacent to a lower surface of the cone filter.

At operation 330, a lid may be installed on the proximal end of the container, wherein a one way valve is positioned within the lid. Responsive to positioning the lid on the proximal end of the container, a second chamber may be formed between the cone filter and the proximal end of the lid, and the cone filter may be secured in place and not able to move.

At operation 340, a hot solvent, such as water, may be poured within the container. The coffee within the hot solvent may be completely submerged within the hot solvent, and be positioned at an upper layer of the hot solvent adjacent below a water surface. This may allow for a total submersion of the coffee during the entirety of the brew process. Further, the hot solvent may encompass the entirety of the cone filter including the lower end and upper end of the cone filter, such that the hot solvent is initially positioned within the first chamber and the second chamber. Additionally, the hot solvent may not be powered into the container until the cone filter is secured in place via the lid. This may be due to the force of the floating coffee within container may apply forces against the filter to move the filter upward. However, because the lid restricts the upward movement of the cone filter, the cone filter may not move even when interacting with the floating coffee applying forces against a lower surface of the cone filter.

At operation 350, the one way valve may be utilized to create a vacuum within the second chamber to lower the pressure within the second chamber. Responsive to lowering the pressure within the second chamber, the boiling point of the coffee may be lowered allowing the coffee to be brewed. Responsive to brewing the coffee at a lower boiling point, a head of foam including carbon dioxide may traverse the filter and be positioned within the second chamber. The vacuum may be utilized to remove the carbon dioxide from the second chamber, while maintaining pressure within the second chamber. This may limit the amount of carbonic acid that interacts with the solvent due to the relative positioning of the coffee at an upper layer of the solvent. Operation 350 may continue a number of times, wherein the second chamber has a lower pressure than atmospheric pressure during the entirety of the brew process.

At operation 360, the one way valve may be removed, and the coffee may be poured through the filter. When the brewed coffee is poured out of the container, the ground coffee may be filtered, via the filter, and remain in the first chamber.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function).

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A system for vacuum brewing coffee comprising:
    a container including first threads and a lip positioned below the first threads;
    a lid with a lower opening, upper opening, and second threads, the second threads being configured to be coupled with the first threads;
    a filter being configured to be positioned between a distal end of the container and a proximal end of the container, the filter being configured to form a first chamber between a lower surface of the filter and the distal end of the container, and a second chamber between an upper surface of the filter and the proximal end of the container, the filter having a rim configured to be positioned on the lip and secured in place via the lower opening, the rim defining the upper surface of the filter;
    ground coffee positioned within the first chamber, the filter being configured to filter the ground coffee and allow for fluids to flow across the filter, wherein the ground coffee includes carbon dioxide, wherein an entirety of the first chamber is configured to be filled with fluid during a brewing process, wherein the ground coffee is configured to be positioned directly below the filter during the brewing process, and a lower portion of the second chamber and the rim of the filter is configured to be filled with the fluid during the brewing process, wherein the ground coffee is submerged directly below the filter for an entirety of the brewing process;
    a one way valve positioned on the upper opening of the lid and configured to allow air and gases to flow from the second chamber across the one way valve into the atmosphere, the one way valve being configured to restrict the flow of air and gases from the atmosphere across the one way valve into the second chamber, wherein the ground coffee is positioned directly below the filter and in an annulus between the filter and the inner surface of the container during the brewing process;
    a vacuum device configured to be positioned on the one way valve move air and gases from the second chamber into the atmosphere across the one way valve to lower a pressure within the second chamber below atmospheric pressure in chamber during an entirety of the brewing process to lower a boiling point of the water to allow the ground coffee to be brewed without an external heating source, the vacuum device being configured to activate the one way valve, the vacuum device being positioned above the rim of the filter, and the one way valve is positioned axially between the vacuum device and the upper opening of the lid, wherein the first chamber is larger than the second chamber.

2. The system of claim 1, wherein the vacuum device is configured to remove carbon dioxide from the second chamber while the ground coffee is submerged within hot water.

3. The system of claim 2, wherein the hot water is positioned over the upper surface of the filter during the entire brewing process.

4. The system of claim 1, wherein the ground coffee is not exposed to air and water simultaneously during the entire brewing process, and the first chamber has a lower pressure than atmospheric pressure during the entire brewing process.

5. The system of claim 1, wherein carbon dioxide moves from the ground coffee to the second chamber across the filter.

6. The system of claim 5, wherein the filter is a cone filter.

7. The system of claim 6, wherein the ground coffee is brewed for four minutes before removing the carbon dioxide.

8. The system of claim 7, wherein the ground coffee is positioned adjacent to the filter during the entire brew process to limit the oxidation of hot water in the first chamber.

9. The system of claim 1, wherein the lid is formed of a transparent material.

10. A method for vacuum brewing coffee comprising:
    positioning a filter between a lid and a container, the container including first threads and a lip positioned below the first threads, the lid including a lower opening, upper opening, and second threads, the second threads being configured to be coupled with the first threads;
    forming a first chamber between a lower surface of the filter and a distal end of the container;
    positioning ground coffee within the first chamber, wherein the ground coffee includes carbon dioxide;
    forming a second chamber between an upper surface of the filter and a proximal end of the container, the filter having a rim configured to be positioned on the lip and secured in place via the lower opening, the rim defining the upper surface of the filter;
    filling an entirety of the first chamber and above the rim of the filter with fluid;
    submerging the ground coffee directly below the filter for an entirety of a brewing process;
    coupling a one way valve with the lid;
    controlling the flow of gases within the second chamber during the brewing process via the one way valve, wherein the one way valve allows gases to flow from the second chamber across the one way valve into an atmosphere and restricts the flow of gases from the atmosphere across the one way valve into the second chamber, wherein the ground coffee is positioned directly below the filter and in an annulus between the filter and the inner surface of the container during the brewing process;
    positioned a vacuum device on the one way valve;
    moving, via the vacuum device, gases from the second chamber into the atmosphere across the one way valve to lower a pressure within the second chamber below atmospheric pressure during the brewing process to lower a boiling point of the water to allow the ground coffee to be brewed without an external heating source, wherein the vacuum device being configured to activate the one way valve, the vacuum device being positioned above the rim of the filter, and the one way valve is positioned axially between the vacuum device and the upper opening of the lid;

removing the one way valve from the lid;

filtering the ground coffee positioned within the first chamber and allowing fluids to flow across the filter when pouring brewed coffee, wherein the first chamber is larger than the second chamber.

11. The method of claim 10, further comprising:

removing, via the vacuum device, carbon dioxide from the second chamber while the ground coffee is submerged within hot water.

12. The method of claim 11, wherein the hot water is positioned over the upper surface of the filter during the entire brewing process.

13. The method of claim 10, wherein the ground coffee is not exposed to air and water simultaneously during the entire brewing process.

14. The method of claim 10, wherein carbon dioxide moves from the ground coffee to the second chamber across the filter.

15. The method of claim 10, wherein the filter is a cone filter.

16. The method of claim 15, wherein the ground coffee is brewed for four minutes before removing the carbon dioxide.

17. The method of claim 16, wherein the ground coffee is positioned adjacent to the filter during the entire brew process to limit the oxidation of hot water in the first chamber.

18. The method of claim 10, wherein the lid is formed of a transparent material.

* * * * *